(12) United States Patent
Göttlein

(10) Patent No.: US 10,778,876 B2
(45) Date of Patent: Sep. 15, 2020

(54) DOMESTIC APPLIANCE WITH OPTICAL MONITORING DEVICE

(71) Applicant: ELECTROLUX APPLIANCES AKTIEBOLAG, Stockholm (SE)

(72) Inventor: Gunther Göttlein, Rothenberg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 75 days.

(21) Appl. No.: 16/311,038

(22) PCT Filed: Jun. 13, 2017

(86) PCT No.: PCT/EP2017/064385
§ 371 (c)(1),
(2) Date: Dec. 18, 2018

(87) PCT Pub. No.: WO2018/001722
PCT Pub. Date: Jan. 4, 2018

(65) Prior Publication Data
US 2019/0316782 A1 Oct. 17, 2019

(30) Foreign Application Priority Data
Jun. 27, 2016 (EP) .................................... 16176453

(51) Int. Cl.
*H04N 5/225* (2006.01)
*F24C 7/08* (2006.01)
(Continued)

(52) U.S. Cl.
CPC ........... *H04N 5/2254* (2013.01); *F24C 3/128* (2013.01); *F24C 7/085* (2013.01); *F24C 15/008* (2013.01); *F24C 15/02* (2013.01)

(58) Field of Classification Search
CPC ....... H04N 5/2254; F24C 3/128; F24C 15/02; F24C 7/085; F24C 15/008
See application file for complete search history.

(56) References Cited

U.S. PATENT DOCUMENTS 10,398,260 B2 * 9/2019 Park ..................... A47J 37/0664
10,419,647 B2 * 9/2019 Park ..................... H04N 5/2257
(Continued)

FOREIGN PATENT DOCUMENTS

EP 2515044 A1 10/2012
EP 2520169 A1 11/2012
(Continued)

OTHER PUBLICATIONS

International Search Report & Written Opinion issued in corresponding patent application No. PCT/EP2017/064385 dated Sep. 14, 2017, 9 pages.

*Primary Examiner* — David J Laux
(74) *Attorney, Agent, or Firm* — Pearne & Gordon LLP

(57) ABSTRACT

The present invention relates to a domestic appliance, in particular domestic oven, comprising: —a treatment chamber; —at least one inner panel (6) and one outer panel (1) for allowing insight into the interior of the treatment chamber from the exterior; —at least one optical monitoring device (4) for optically monitoring at least a part of the interior of the treatment chamber through the inner panel (6) and the outer panel (1); —at least one optical shade element (2) for at least partially preventing irritating light from reaching an optical sensor of the optical monitoring device (4); characterized in that the optical monitoring device (4) is arranged on a side of the outer panel (1) opposite to the treatment chamber side of the outer panel (1) and in a distance to the outer panel (1), and wherein the optical shade element (2) is arranged in an intermediate space between inner panel and outer panel (1) and circumferentially encloses at least par- (Continued)

Figure 1:
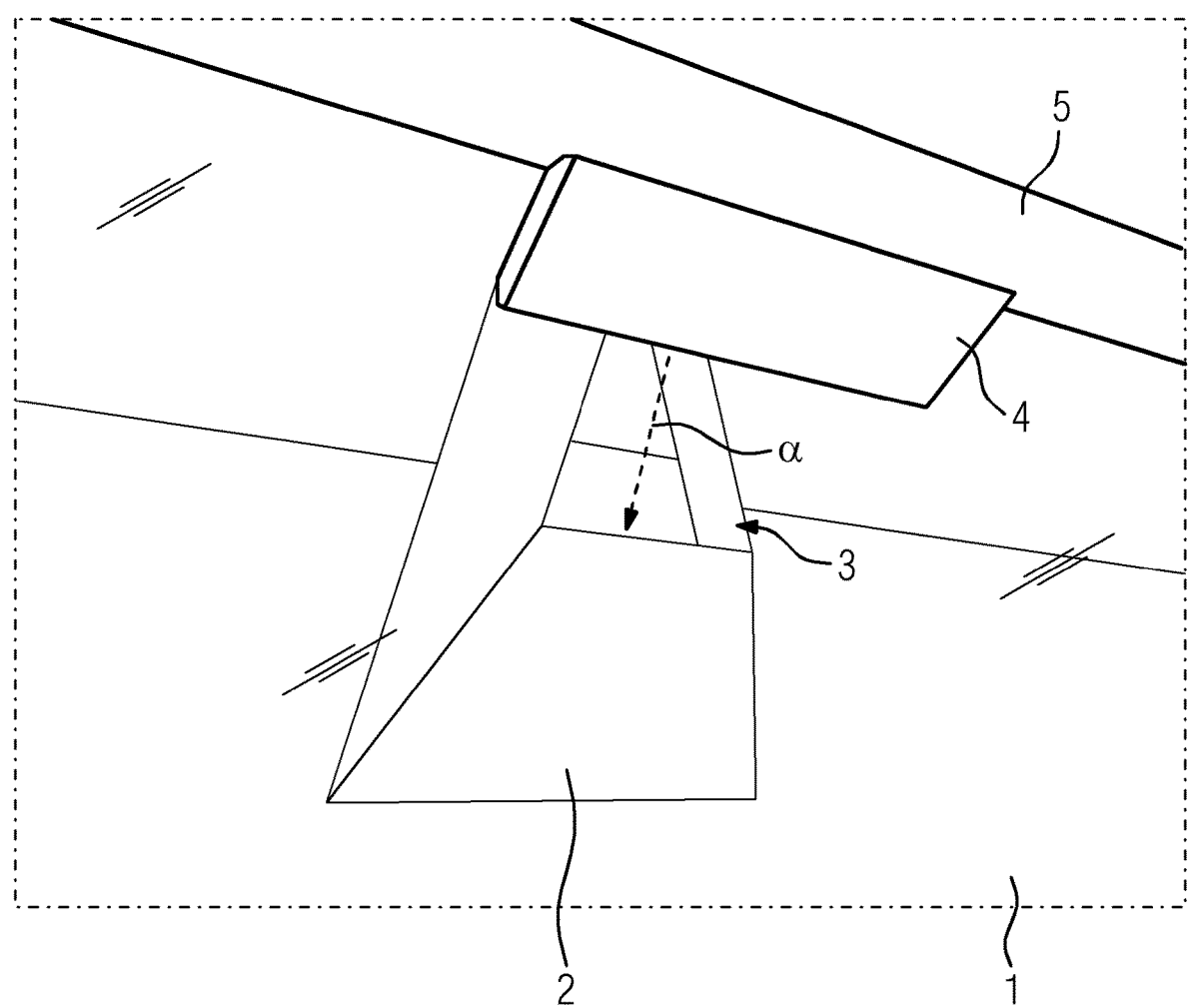

tially the optical path (9) of the optical monitoring device (4) extending from the interior of the treatment chamber to the sensor of the optical monitoring device (4) through the inner panel, the outer panel (1) and the intermediate space between inner panel and outer panel (1).

10 Claims, 3 Drawing Sheets

(51) Int. Cl.
*F24C 15/00* (2006.01)
*F24C 15/02* (2006.01)
*F24C 3/12* (2006.01)

(56) References Cited

U.S. PATENT DOCUMENTS

| | | | |
|---|---|---|---|
| 2006/0081135 A1* | 4/2006 | Britton | A21B 7/00 99/486 |
| 2014/0048055 A1* | 2/2014 | Ruther | F24C 15/006 126/198 |
| 2016/0366314 A1* | 12/2016 | Pfaffinger, Jr. | F24C 7/085 |
| 2017/0208652 A1* | 7/2017 | Luckhardt | H04N 5/2256 |

FOREIGN PATENT DOCUMENTS

| | | | |
|---|---|---|---|
| WO | 2015185211 A2 | 6/2015 | |
| WO | 2016034295 A1 | 3/2016 | |

* cited by examiner

DOMESTIC APPLIANCE WITH OPTICAL MONITORING DEVICE

The present invention relates to a domestic appliance comprising an optical monitoring device and an optical shade element.

The document WO 2015/185211 A2 discloses a heat treatment monitoring system on a heat treatment machine having a heat treatment chamber and at least one light source mounting for mounting a light source for illuminating the inside of the heat treatment chamber. A monitoring apparatus is provided comprising a camera, a camera light source and a mounting part.

This document discloses that a problem arises if an external light source is present outside of the oven chamber in front of a double glass window. Irritating light emitted by the external light source may pass through an outside window of the double glass window, but might be reflected by the inside window into a camera observing food. Therefore, the camera does not only obtain light emitted or reflected from the food, but also irritating light, reflected at the inside wall. This results in a deterioration of the image data provided by the camera.

According to WO 2015/185211 A2 this adverse effect was prevented by hindering the irritating light to pass through an outside window of the oven door. This may be done by tinting or darkening the outside window. Then, the irritating light is reflected or absorbed by the outside window and does not reach the inside window. Further, it is disclosed by this document to provide a camera and a ring of light sources surrounding the camera in one unit or on one integrating mount.

Referring to such an embodiment, it is disclosed to prevent reflections at one of the glass planes coming from the illumination by integrating an optical tunnel consisting of a hose-like structure starting from the visual sensor and supporting the reflector surface, protecting the visual sensor of the camera from direct reflections by the glass panel surface from the camera light source. The optical tunnel is part of the camera sensor mount.

It is an object of the present invention to provide a domestic appliance with reduced negative effective or irritating light on an image captured by a camera monitoring the interior of a treatment chamber from outside of the treatment chamber through a transparent panel and to be able to use transparent panels of a very high degree of optical transmission at the same time.

Further, it is an object of the invention to provide a domestic appliance benefiting from these effects with a low number of parts necessary for achieving these effects and being easier to assemble. It is also desired to use parts of low complexity.

The objects of the invention are achieved by a domestic appliance having an optical monitoring device that is arranged on a side of the outer panel opposite to the treatment chamber side of the outer panel and in a distance to the outer panel, and wherein the optical shade element is arranged in an intermediate space between inner panel and outer panel and circumferentially encloses at least partially, preferably encloses fully in circumferential direction, the optical path of the optical monitoring device extending from the interior of the treatment chamber to the sensor of the optical monitoring device through the inner panel, the outer panel and the intermediate space between inner panel and outer panel.

Thus, it is possible to hinder irritating light that is reflected, refracted or scattered on one or more of the boundary surfaces of the panels from reaching the sensor of the optical monitoring device. The image quality of the optical monitoring device is increased. Further, such an optical shade element can be added to existing doors as well as to new doors in a very simple process.

According to an advantageous embodiment of the invention the optical shade element comprises a, in particular funnel-shaped, body forming an aperture with a monitoring device side opening and a subject-to-be-monitored-side opening, in particular wherein the aperture comprises an aperture angle corresponding to an angle of view of the optical monitoring device.

By forming an aperture the optical monitoring device is enabled to look through the optical shade element without any substantial obstacles located between the optical monitoring device and the subject to be monitored. If the aperture angle of the of the aperture is adapted to or corresponds with the angle of view of the optical monitoring device, the best compromise is reached between deflecting irritating light and allowing the best view on the subject to be monitored. The subject to be monitored side opening could also be called treatment chamber side opening of the aperture.

According to a further advantageous embodiment of the invention the domestic appliance comprises a door for selectively opening or closing the treatment chamber, wherein the door comprises the inner panel and outer panel and/or wherein the optical monitoring device is attached to a gripping device or a handle of the door.

The optical shade element has a very positive effect for a monitoring device such as a camera attached to a handle of a door. Thus, the optical shade element is able to eliminate the effect of very negative lighting conditions, e.g. if the oven door is placed in direct sunlight penetrating through a kitchen window at sunrise or sunset.

In a further advantageous embodiment of the invention the optical shade element is arranged in an upper central region of the door.

Thus, the user's view through the panels directly toward the subject to be monitored, is not or only marginally impeded.

According to a further advantageous embodiment the domestic appliance comprises three or four panels, each panel being distanced from each adjacent panel by an intermediate space, wherein the optical shade element is arranged in each respective intermediate space located between respective two of said panels.

The optical shade element is particularly advantageous if used in a door having three or four panels. Since a plurality of panels increases the number of boundary surfaces causing irritating light effects, the optical path through the panels and the intermediate spaces between these panels can be efficiently protected by the optical shade element of such configuration.

In a further advantageous embodiment the optical shade element comprises a body having one or more recesses, said one or more recesses each accommodating one of said three or four panels, wherein said one of said three or four panels being different from the inner panel and the outer panel.

In particular, the recesses are dimensioned such that the panels fit in snugly, preferably in such way that no light can pass between the body of the optical shade element at the recess and the boundary surface of each respective panel.

Thus, the optical shade element can be provided as one integral part that can be assembled with the door and the panels in only few simple assembling steps. The optical path is shaded efficiently from the irritating light.

According to a further advantageous embodiment of the invention the panels are glass panels and the glass panels are substantially fully transparent in the visible optical wavelength range. Additionally or alternatively, it is an advantageous embodiment of the invention, if the panels are glass panels and the glass panels are not tinted or darkened.

The advantage of the optical shade elements is highly positive when used on panels which are substantially fully transparent in the visible optical wavelength range. No tinting or darkening of the panel is necessary for protecting the optical monitoring device from irritating light generated on the boundary surfaces of the panels.

In a further advantageous embodiment of the invention the optical shade element is made of an opaque material, preferably of metal, plastics, paper or glass.

If the optical shade element is made of an opaque material, in other words of a fully non transparent material, the effect of irritating light is further reduced.

Novel and inventive features of the present invention are set forth in the appended claims.

Figure 2:
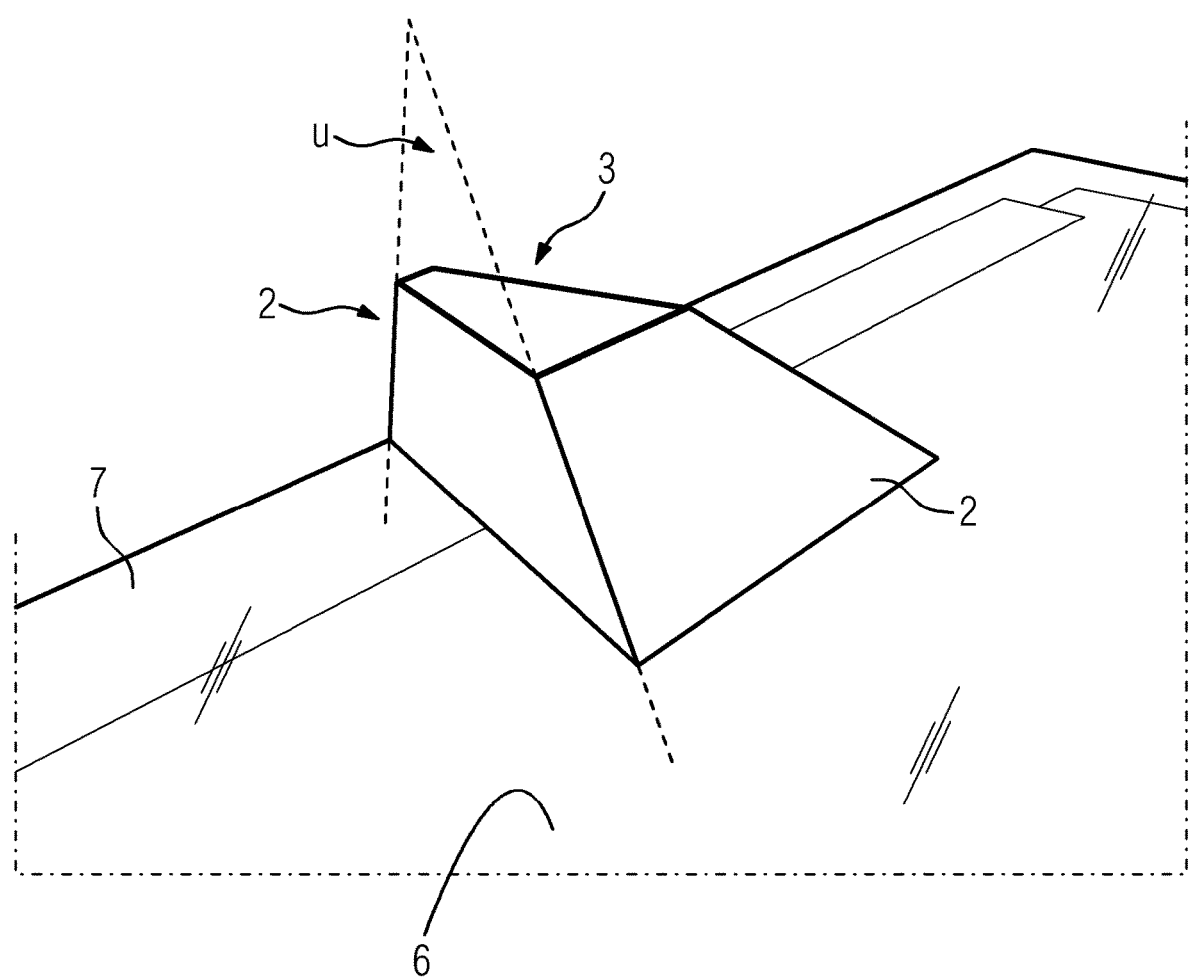
Figure 3:
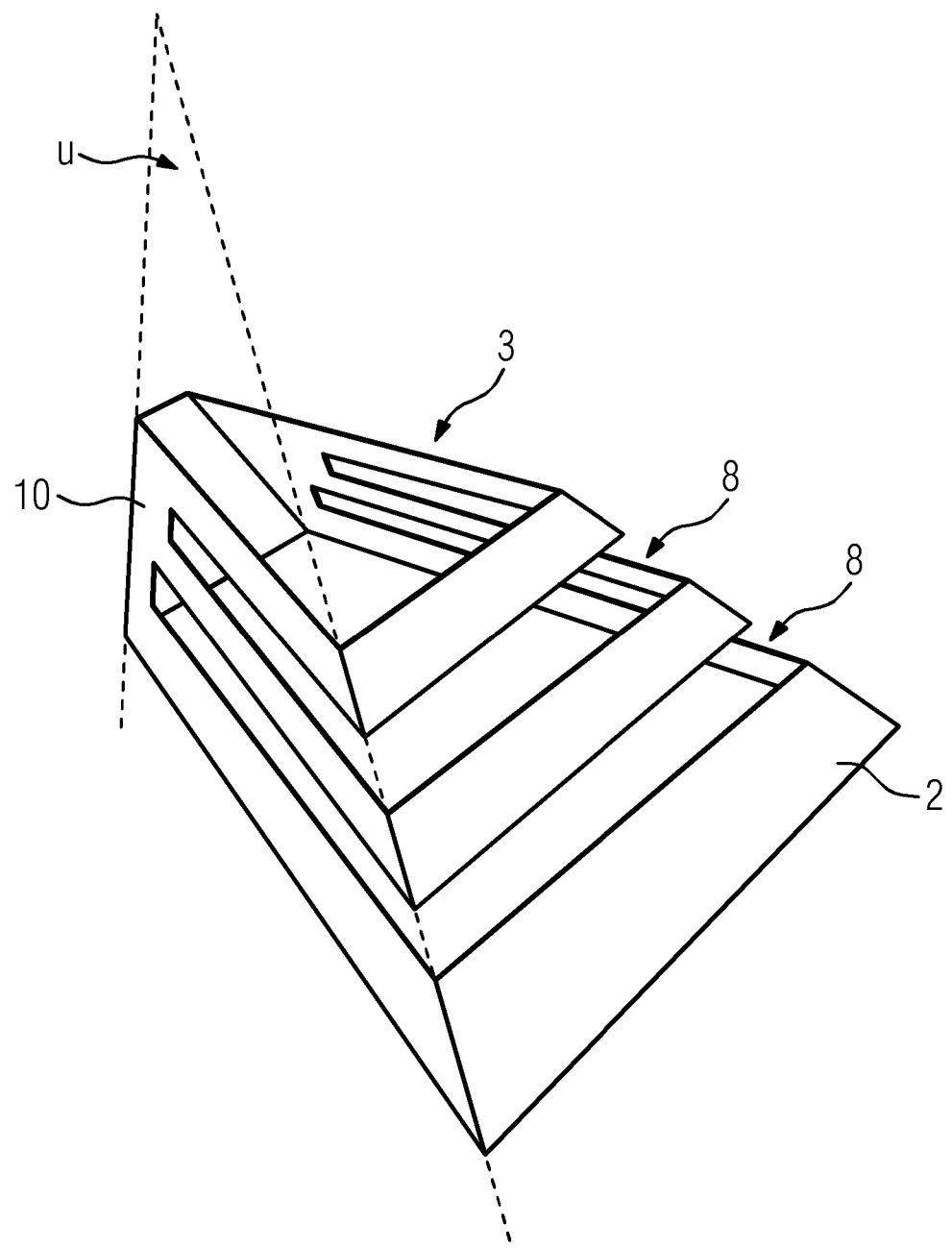

The present invention will be described in further detail with reference to the drawings, in which FIG. 1 illustrates a perspective view of an optical shade element installed in an oven door, FIG. 2 illustrates a perspective view of the optical shade element of FIG. 1 with outer panel and door handle being removed, FIG. 3 illustrates a perspective view of an optical shade element for a door having four panels, FIG. 1 illustrates a perspective view of an upper central region of a domestic oven door seen from the exterior.

FIG. 2 illustrates a perspective view of the same domestic oven door part wherein an outer panel and a door handle of the oven door are removed.

The oven door has an outer glass panel 1, i. e. a glass panel arranged on the oven door side directed toward the exterior and an inner glass panel 6, i. e. a glass panel arranged on the oven door side directed toward the interior of the domestic oven. The domestic oven door is provided for selectively opening or closing a treatment chamber arranged inside of the domestic oven. The domestic oven door may be pivotally attached to the oven via a horizontal axis or via a vertical axis. Alternatively, the domestic oven door may be part of an oven cart or of a pull out door of the domestic oven.

The oven door comprises a door handle 5 to which an optical monitoring device 4 may be fixedly or releasably attached. The optical monitoring device 4 may be a camera for recording or capturing the image of food stuff to be cooked inside the treatment chamber. The door handle 5 may be formed as a rod. Further, the door handle 5 may extend horizontally in an upper region of the oven door.

The optical monitoring device 4 is arranged in an upper central region of the oven door in such way that it is able to capture an image of the treatment chamber by viewing or with a view through the panels 1, 6. Since the optical monitoring device 4 is arranged in an upper region of the oven door, it is necessary to position the optical monitoring device 4 inclined relative to a horizontal plane. The inclined position of the monitoring device 4 relative to a horizontal plane allows to capture an image of food stuff which is placed on a food stuff carrier within the treatment chamber independent from the vertical position of a food stuff carrier inside of the treatment chamber.

It should be comprehended, that the optical monitoring device 4 may be attached otherwise outside of the treatment chamber in a way that is enabled to look through the panels 1, 6 of an oven door or of a window separate from the oven door in order to capture an image of the subject to be heated inside the treatment chamber.

Between inner panel 6 and outer panel 1 an intermediate space is provided in which an optical shade element 2 is arranged. The optical shade element 2 comprises a substantially funnel shaped body forming an aperture with a monitoring device side opening 3 and a treatment chamber side opening. The optical shade element 2 is positioned relative to the optical monitoring device 4 in such a way that the optical path of the optical monitoring device 4, i. e. the optically direct connection between object to be monitored and recording or capturing sensor of the optical monitoring device 4, is circumferentially enclosed by the optical shade element 2.

Thus, irritating light that is produced by refraction, scattering or reflection effects on the boundary surfaces of the panels 1, 6 is prevented to enter the optical path between the panels 1, 6. As a consequence, the irritating light produced in the intermediate space between the panels 1, 6 is hindered to follow the optical path to the outer panel 1 towards the sensor of the optical monitoring device 4. Therefore, image captured by the optical monitoring device 4 is less irritated by irritating light and the image quality is improved.

The sensor of the optical monitoring device 4 at the optical monitoring device 4 has an angle of view $\alpha$ that determines a field of view at a certain distance to the sensor. The angle of view $\alpha$ may be different in a horizontal plane from the angle of view of the sensor in a vertical plane. In the example of FIG. 1, the indicated angle of view $\alpha$ lies within a vertical plane.

The aperture of optical shade element 2 is adapted to the angle of view $\alpha$ of the optical monitoring device 4 in that the monitoring device side opening 3 of optical shade element 2 and the treatment chamber side opening of optical shade element 2 are dimensioned such that the aperture of optical shade element 2 has an aperture angle u in the vertical plane corresponding to the angle of view $\alpha$ of the sensor or of the optical monitoring device in the vertical plane. The same adaption can be advantage only provided for an angle of view $\alpha$ lying in a horizontal plane.

FIG. 3 illustrates a perspective view of an optical shade element 2 for an oven door having four door panels. The optical shade element 2 is provided optically similar to the optical shade element 2 that is shown in FIGS. 1 and 2. However, the body of optical shade element 2 has two recesses 8 adapted to accommodate parts of these panels arranged additionally between outer and inner panel 1, 6. The optical shade element 2 has a support portion 10 or top portion that extends from outer panel 1 to inner panel 6 in a mounted situation of the optical shade element 2 and that bridges over the additional panels.

Also in this embodiment, the aperture angle u is adapted correspondingly to the angle of view $\alpha$ of the optical monitoring device 4.

The optical shade element 2 as shown in FIGS. 1 to 3 is designed and assembled to the panels 1, 6 and optionally also to the additional panels to provide contact to the panels that is substantially opaque or optically sealed in such way that substantially no irritating light is allowed to enter the optical path of the optical monitoring device 4.

LIST OF REFERENCE NUMERALS 1 outer panel
2 optical shade element
3 monitoring device side opening 4 optical monitoring device
5 door handle
6 inner panel
7 door frame part
8 recesses
9 optical path
10 support portion
α angle of view
u aperture angle

The invention claimed is:

1. Domestic oven, comprising:
   a treatment chamber;
   a plurality of panels comprising an inner panel and an outer panel for allowing insight into an interior of the treatment chamber from the exterior;
   an optical monitoring device for optically monitoring at least a part of the interior of the treatment chamber through the inner panel and the outer panel;
   an optical shade element for at least partially preventing irritating light from reaching an optical sensor of the optical monitoring device, said optical shade element comprising a body having a plurality of recesses accommodating respectively said plurality of panels;
   wherein the optical monitoring device is arranged on a side of the outer panel opposite to the treatment chamber and at a distance to the outer panel, and wherein the optical shade element is arranged in an intermediate space between said inner panel and said outer panel and circumferentially encloses at least partially an optical path of the optical monitoring device extending from the interior of the treatment chamber to the sensor of the optical monitoring device through the inner panel, the outer panel and the intermediate space between said inner panel and said outer panel.

2. Domestic oven according to claim 1, wherein the optical shade element comprises a funnel-shaped body forming an aperture and having a monitoring device side opening and a treatment-chamber side opening, the aperture having an aperture angle corresponding to an angle of view of the optical monitoring device.

3. Domestic oven according to claim 1, further comprising a door for selectively opening or closing the treatment chamber, wherein the door comprises the inner panel and the outer panel and/or wherein the optical monitoring device is attached to a gripping device or a handle of the door.

4. Domestic oven according to claim 3, wherein the optical shade element (2) is arranged in an upper central region of the door.

5. Domestic oven according to claim 1, said plurality of panels comprising three or four panels, each said panel being distanced from each adjacent panel by an intermediate space, wherein the optical shade element is arranged in each respective intermediate space located between each pair of said adjacent panels.

6. Domestic oven according to claim 1, wherein the panels are glass panels that are substantially fully transparent in the visible optical wavelength range, and/or wherein the panels are glass panels that are not tinted or darkened.

7. Domestic oven according to claim 1, wherein the optical shade element is made of an opaque material.

8. A cooking oven comprising a treatment chamber for cooking food, a door configured to selectively open and close said treatment chamber, said door comprising a transparent, un-tinted inner panel and a transparent, un-tinted outer panel separated from one another and defining a space therebetween, a sensor disposed adjacent to said outer panel on a side thereof opposite the treatment chamber, said sensor being adapted to capture an image of a food stuff when being cooked inside the treatment chamber via an optical path inclined at an angle α in an imaginary vertical plane, said optical path extending through said first panel and said second panel, a funnel-shaped opaque optical shade extending between the first and second panels within said space and defining a funnel-shaped aperture that surrounds the optical path in said space, said funnel-shaped aperture converging from a first opening thereof adjacent said inner panel to a second opening thereof adjacent said outer panel so as to define an aperture angle u of said funnels-shaped aperture in said imaginary vertical plane, wherein said aperture angle u corresponds to said angle α, said optical shade being effective to inhibit light emitted from an external source and entering said space through said outer panel from being reflected or scatted within said space.

9. The cooking oven according to claim 8, said door further comprising an intermediate transparent, un-tinted panel disposed in said space between said inner and outer panels, said optical path passing through said intermediate panel, said funnel-shaped optical shade having a recess within which a portion of said intermediate panel through which said optical path passes is received.

10. The cooking oven according to claim 9, each of said panels being fully transparent to visible light in the visible spectrum.

* * * * *